June 14, 1927.
R. W. FOX
TIRE REPAIR SCRAPER
Filed Aug. 19, 1926
1,632,544
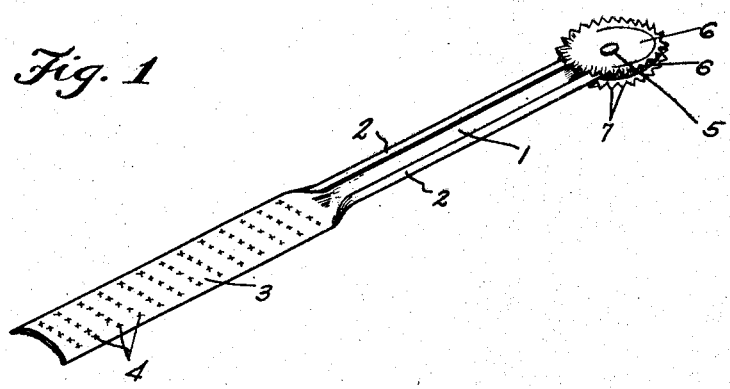
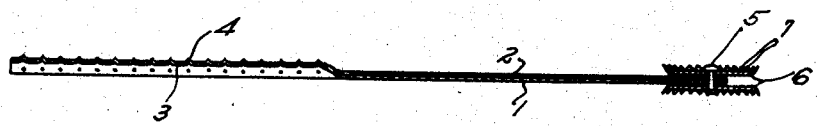
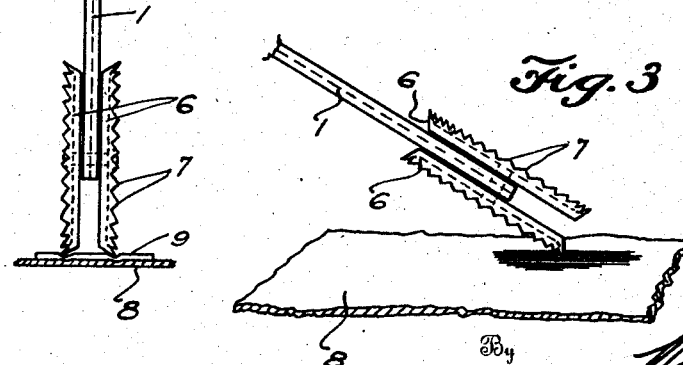
Inventor
R.W.Fox.
By
Attorney Patented June 14, 1927.

1,632,544

UNITED STATES PATENT OFFICE.

RICHARD W. FOX, OF BIRMINGHAM, ALABAMA.

TIRE-REPAIR SCRAPER.

Application filed August 19, 1926. Serial No. 130,174.

My invention relates to a scraping and rolling tool for applying cold patches to various rubber articles such as tires, inner tubes, water bags, and the like.

In the application of patches to rubber surfaces it is customary to first clean the surface to be patched after which it should be well scraped so as to provide the best available surface for the repair material to take a firm hold. After the patch has been applied, it is advisable to roll it or rub it thoroughly so that all air will be squeezed out from between the rubber surfaces and the cement will thoroughly and completely engage and bond together all portions of the rubber patch and the underlying surface.

The purpose of my present invention is to adapt one tool to supply all the needed operations for the most effective application of cold patches, and to this end it contemplates providing a suitable support for a roller or rollers adapted to serve as a scraper, the handle being preferably adapted also to serve as a scraper where large surfaces are to be worked over.

My invention will be better understood by reference to the accompanying drawings which illustrate its preferred embodiment, and in which:—

Fig. 1 is a perspective view of the scraping and rolling device; and

Fig. 2 is a longitudinal cross-sectional view through the same.

Fig. 3 is an enlarged detail view showing roller scraper in use.

Fig. 4 is an end view showing the roller scrapers used to roll the patch on the work.

Similar reference numerals refer to similar parts throughout the drawings.

My improved article of manufacture, in its preferred embodiment, comprises a metallic handle portion 1 having its side edges rolled over at 2 along each side to stiffen it and having at its grip end a transversely arched scraper 3 provided with burrs 4 or the like, which can be effectively used to abrade, clean and roughen a rubber surface to be patched. At its other end the handle is provided with an aperture for a rivet 5 which pivotally mounts on opposite sides of the handle a pair of similar disk rollers 6 having their reversely disposed out-turned marginal edges serrated to form scraping teeth 7. These marginal edges are turned out almost at right angles so that they will have peripheral surfaces adapted jointly to serve as a roller to roll the patch down on the tire, tube, or the like. To scrape the surface to be patched, it is only necessary to grip the tool 1 or 3 and present one of the disks 6 so that its teeth 7 will engage the surface 8 (see Fig. 3), to be scraped and draw it over such surface until it has effectively cleaned and roughened the same. The roller scrapers will be most effective for small surfaces and, due to their changing position and the use of the two of them, the rollers will maintain their efficiency as a scraper for a long time. Where, however, it is necessary to work over large surfaces, it may be desirable to reverse the tool and scrape the latter by means of the scraper 3, or the latter can be used for the preliminary cleaning of the surface, and the roller scrapers for the finishing scraping of the surface and then for the rolling down of the applied patch 9 on the prepared surface 8, as seen in Fig. 4. The device is made up lightly and inexpensively so that it can form a part of a scraper repair kit and thus supplies a long felt need by motorists and repair shops.

Though I have described with great particularity the details of the embodiment of the invention herein shown, it is not to be construed that I am limited thereto, as changes in arrangment and substitution of equivalents may be made by those skilled in the art without departing from the invention as defined in the appended claims.

Having thus described my invention, what I claim as new and desire to secure by Letters Patent, is:—

1. As an article of manufacture, a handle having pivotally mounted on an end thereof, a disked roller having a scraper surface along its sharply out-turned marginal rolling edge.

2. As an article of manufacture, a handle having a pair of closely associated disked rollers pivotally mounted concentrically thereon and having their marginal edges sharply out-turned in opposite direction and roughened, as and for the purposes described.

In testimony whereof I affix my signature.

RICHARD W. FOX.